US012658431B2

(12) United States Patent
Do et al.

(10) Patent No.: US 12,658,431 B2
(45) Date of Patent: Jun. 16, 2026

(54) CATHODE ACTIVE MATERIAL FOR LITHIUM SECONDARY BATTERY AND LITHIUM SECONDARY BATTERY INCLUDING THE SAME

(71) Applicants:SK ON CO., LTD., Seoul (KR); SK INNOVATION CO., LTD., Seoul (KR)

(72) Inventors: Ji Yae Do, Daejeon (KR); Jeong Bae Yoon, Daejeon (KR); Min Suk Kang, Daejeon (KR); Hee Jun Kweon, Daejeon (KR); Sang Bok Kim, Daejeon (KR); Yong Hyun Cho, Daejeon (KR); Dong Wook Ha, Daejeon (KR)

(73) Assignees: SK On Co., Ltd., Seoul (KR); SK INNOVATION CO., LTD., Seoul (KR)

( * ) Notice: Subject to any disclaimer, the term of this patent is extended or adjusted under 35 U.S.C. 154(b) by 484 days.

(21) Appl. No.: 18/306,241

(22) Filed: Apr. 25, 2023

(65) Prior Publication Data

US 2023/0361291 A1    Nov. 9, 2023

(30) Foreign Application Priority Data

May 9, 2022    (KR) ........................ 10-2022-0056394

(51) Int. Cl.
H01M 4/505        (2010.01)
C01G 53/50        (2025.01)
            (Continued)
(52) U.S. Cl.
CPC ............ H01M 4/505 (2013.01); C01G 53/50 (2013.01); H01M 4/131 (2013.01); H01M 4/525 (2013.01);
(Continued)

(58) Field of Classification Search
None
See application file for complete search history.

(56) References Cited

U.S. PATENT DOCUMENTS

2011/0269018 A1    11/2011   Kono et al.
2022/0131139 A1*    4/2022   Kaneda ................. H01M 4/505

FOREIGN PATENT DOCUMENTS

JP        2019-016428  A      1/2019
KR    10-2010-0063041  A      6/2010
                (Continued)

OTHER PUBLICATIONS

Extended European Search Report for the European Patent Application No. 23172166.3 issued by the European Patent Office on Oct. 16, 2023.

(Continued)

*Primary Examiner* — Scott J. Chmielecki
(74) *Attorney, Agent, or Firm* — IP & T GROUP LLP

(57)        ABSTRACT

A cathode active material for a lithium secondary battery according to an embodiment of the present invention includes a lithium-transition metal oxide particle. The lithium-transition metal oxide particle has a FWHM ratio measured by an in-situ X-ray Diffraction spectroscopy (XRD) and defined by Equation 1 of 400% or less. Life-span properties of a lithium secondary battery can be improved by preventing deformation of a lattice structure and/or a crystal structure in the lithium-transition metal composite oxide particles.

11 Claims, 2 Drawing Sheets

(51) Int. Cl.

| | | |
|---|---|---|
| *H01M 4/02* | (2006.01) | |
| *H01M 4/131* | (2010.01) | |
| *H01M 4/525* | (2010.01) | |
| *H01M 10/052* | (2010.01) | |

(52) U.S. Cl.
CPC ....... *H01M 10/052* (2013.01); *C01P 2002/52* (2013.01); *C01P 2002/74* (2013.01); *C01P 2006/40* (2013.01); *H01M 2004/028* (2013.01)

(56) References Cited

FOREIGN PATENT DOCUMENTS

| | | | |
|---|---|---|---|
| KR | 10-2010-0133421 | A | 12/2010 |
| KR | 10-2011-0126683 | A | 11/2011 |
| KR | 10-2017-0093085 | A | 8/2017 |

OTHER PUBLICATIONS

Dengke Zhang et al., Effect of Ti ion doping on electrochemical performance of Ni—rich LiNi0.8Co0.1Mn0.1O2 cathode material, Electrochimica Acta, Oct. 15, 2019, vol. 328, Elsevier. Available online: https://doi.org/10.1016/j.electacta.2019.135086.

Yeting LV et al., Improved electrochemical performances of Ni—rich LiNi0.83Co0.12Mn0.05O2 by Mg—doping, Journal of Power Sources, Jan. 29, 2020, vol. 450, Elsevier. Available online: https://doi.org/10.1016/j.jpowsour.2020.227718.

Office Action for Korean Patent Application No. 10-2022-0056394 issued by the Korean Patent Office on May 7, 2026.

* cited by examiner

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2022-0056394 filed on May 9, 2022 in the Korean Intellectual Property Office (KIPO), the entire disclosure of which is incorporated by reference herein.

BACKGROUND

1. Field

The present invention relates to a cathode active material for a lithium secondary battery and a lithium secondary battery including the same. More particularly, the present invention relates to a lithium metal oxide-based cathode active material for a lithium secondary battery and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as an eco-friendly power source of an electric automobile, a hybrid vehicle, etc.

Examples of the secondary battery includes, e.g., a lithium secondary battery, a nickel-cadmium battery, a nickel-hydrogen battery, etc. The lithium secondary battery is being actively developed due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

A lithium-transition metal composite oxide may be used as a cathode active material for the lithium secondary battery. The lithium-transition metal composite oxide may include, e.g., a nickel-based lithium metal oxide.

As an application range of the lithium secondary batteries is being expanded, higher capacity and longer life-span are required while maintaining operational stability. However, a non-uniformity of a chemical structure may be increased due to deformation of a crystal structure in the lithium-transition metal composite oxide. In this case, capacity and life-span properties of the lithium secondary battery may be deteriorated.

SUMMARY

According to an aspect of the present invention, there is provided a cathode active material for a lithium secondary battery having improved operational stability and reliability.

According to an aspect of the present invention, there is provided a lithium secondary battery including a cathode active material with improved operational stability and reliability.

A cathode active material for a lithium secondary includes a lithium-transition metal oxide particle. The lithium-transition metal oxide particle has a FWHM ratio measured by an in-situ X-ray Diffraction spectroscopy (XRD) and defined by Equation 1 of 400% or less.

$$\text{FWHM ratio (\%)}=100*(\text{FWHM}_{max}(101)/\text{FWHM}_{min}(101)) \qquad \text{[Equation 1]}$$

In Equation 1, $\text{FWHM}_{max}(101)$ is a maximum FWHM value of a (101) plane peak of the lithium-transition metal oxide particle measured by the in-situ XRD, and $\text{FWHM}_{min}(101)$ is a minimum FWHM value of a (101) plane peak of the lithium-transition metal oxide particle measured by the in-situ XRD.

In some embodiments, the FWHM ratio may be in a range from 100% to 250%.

In some embodiments, the $\text{FWHM}_{max}(101)$ may be 0.250 or less.

In some embodiments, the $\text{FWHM}_{min}(101)$ may be 0.075 or more.

In some embodiments, a change of the FWHM value of the (101) plane peak of the lithium-transition metal oxide particle during charging and discharging of the lithium secondary battery is measured in real time through the in-situ XRD.

In some embodiments, the lithium-transition metal oxide particle includes at least two-types of doping elements.

In some embodiments, the lithium-transition metal oxide particle may be represented by Chemical Formula 1 below.

$$\text{Li}_x\text{Ni}_a\text{Co}_b\text{Mn}_c\text{M1}_d\text{M2}_e\text{O}_{2+y} \qquad \text{[Chemical Formula 1]}$$

In Chemical Formula 1, M1 and M2 may each include at least one of Ti, Zr, Al, Mg and W, and $0.8 < x < 1.5$, $0.70 \le a \le 0.98$, $0 \le b \le 0.20$, $0.02 \le c \le 0.30$, $0 < d+e \le 0.05$, $0.98 \le a+b+c \le 1.02$, and $-0.1 \le y \le 0.1$.

In some embodiments, in Chemical Formula 1, $0.05 \le d/e \le 5.5$.

In some embodiments, in Chemical Formula 1, $0.50 \le d/e \le 3.5$.

In some embodiments, the lithium-transition metal oxide particle may have a FWHM change ratio defined by Equation 2 below of 350% or less.

$$\text{FWHM change ratio (\%)}=100*(\text{FWHM}_{max}(113)/\text{FWHM}_{min}(113)) \qquad \text{[Equation 2]}$$

In Equation 2, $\text{FWHM}_{max}(113)$ is a maximum FWHM value of a (113) plane peak of the lithium-transition metal oxide particle measured by the in-situ XRD, and $\text{FWHM}_{min}(113)$ is a minimum FWHM value of a (113) plane peak of the lithium-transition metal oxide particle measured by the in-situ XRD.

In some embodiments, the FWHM change ratio may be less than 300%.

A lithium secondary battery includes a cathode including a cathode active material layer that includes the cathode active material for a lithium secondary battery according to the above-described embodiments, and an anode facing the cathode.

According to embodiments of the present invention, a FWHM ratio of lithium-transition metal composite oxide particles included in a cathode active material measured through an in-situ XRD may be 400% or less. Within the range of the FWHM ratio, distortion of a lattice structure and/or a crystal structure of the lithium-transition metal composite oxide particle may be suppressed. Further, particle cracks and side reactions in an electrode may be suppressed. Accordingly, an amount of gas generation from the lithium secondary battery may be reduced and life-span properties may be improved.

In some embodiments, the lithium-transition metal composite oxide particle may include at least two doping elements. In this case, the doping elements may be uniformly distributed at a lithium site or a transition metal site of the lithium-transition metal oxide particle, so that structural stability of the lithium-transition metal oxide particle may be improved during intercalation/deintercalation of lithium ions. Accordingly, distortion and phase transition of the lattice structure and/or the crystal structure of the lithium-transition metal oxide particles may be prevented.

DETAILED DESCRIPTION OF THE EMBODIMENTS

Figure 1:
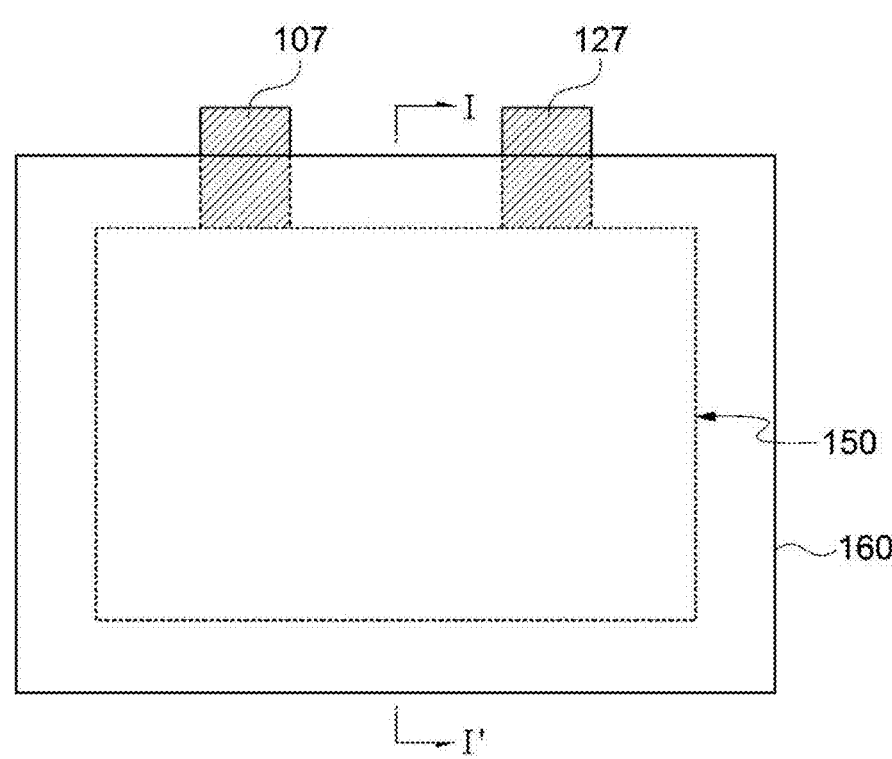
FIGS. 1 and 2 are a schematic plan view and a schematic cross-sectional view, respectively, illustrating a lithium secondary battery in accordance with exemplary embodiments.

According to embodiments of the present invention, a cathode active material for a lithium secondary battery including a lithium-transition metal oxide particle and a lithium secondary battery including the cathode active material are provided.

Hereinafter, embodiments of the present invention will be described in detail with reference to exemplary embodiments and the accompanying drawings. However, those skilled in the art will appreciate that such embodiments and drawings are provided to further understand the spirit of the present invention and do not limit subject matters to be protected as disclosed in the detailed description and appended claims.

In exemplary embodiments, the cathode active material may include a lithium-transition metal oxide particle. For example, the lithium-transition metal composite oxide particle may have a single-crystal structure or a poly-crystal structure in a crystallographic aspect.

In some embodiments, the lithium-transition metal oxide particle includes nickel (Ni) and may further include at least one of cobalt (Co) and manganese (Mn).

Ni may serve as a transition metal related to a power and a capacity of a lithium secondary battery. Accordingly, a high-Ni composition may be employed in the lithium-transition metal oxide particle, so that high-power cathode and lithium secondary battery may be implemented.

As the content of Ni increases, long-term storage stability and life-span stability of the cathode or the secondary battery at high temperatures may be relatively deteriorated. However, according to exemplary embodiments, life-span stability and capacity retention properties may be improved through Mn while maintaining an electrical conductivity by including Co.

For example, the lithium-transition metal oxide particle may include a plurality of primary particles.

For example, a distortion of a lattice structure in primary particles included in the lithium-transition metal oxide particle or between the primary particles may occur according to charging and discharging of the lithium secondary battery. In this case, a stress and a strain at an inside of the lithium-transition metal oxide particle may increase. Accordingly, cracks may occur in the lithium-transition metal oxide particle to result in an increase of a gas generation and a deterioration of the life-span of the lithium secondary battery.

For example, the distortion of the lattice structure and/or the crystal structure described above may cause a peak shift in a measurement through an X-ray Diffraction spectroscopy (XRD). In this case, a width of each peak may become wider as charging and discharging progresses, and a full width at half maximum (FWHM) value may be increased. Accordingly, a difference between a maximum value of the FWHM and a minimum value of the FWHM may be increased during the charging and discharging.

According to embodiments of the present invention, the lithium-transition metal oxide particle may have a FWHM ratio of 400% or less, preferably from 100% to 250%. measured by an in-situ XRD and defined by Equation 1 below, $$\text{FWHM ratio } (\%) = 100 * (\text{FWHM}_{max}(101)/\text{FWHM}_{min}(101)) \quad \text{[Equation 1]}$$

In Equation 1, $\text{FWHM}_{max}(101)$ is a maximum FWHM value of a (101) plane peak of the lithium-transition metal oxide particle measured by the in-situ XRD. For example, $\text{FWHM}_{max}(101)$ may be a maximum FWHM value of the (101) plane peak of the lithium-transition metal oxide particle measured by the in-situ XRD while charging and discharging the lithium secondary battery once.

In Equation 1, $\text{FWHM}_{min}(101)$ is a minimum FWHM value of a (101) plane peak of the lithium-transition metal oxide particle measured by the in-situ XRD. For example, $\text{FWHM}_{min}(101)$ may be a minimum FWHM value of the (101) plane peak of the lithium-transition metal oxide particle measured by the in-situ XRD while charging and discharging the lithium secondary battery once.

For example, the $\text{FWHM}_{max}(101)$ may be a FWHM(101) value at a point where the deformation of the crystal structure of the lithium-transition metal oxide particle is the greatest during the charging and discharging.

For example, the $\text{FWHM}_{min}(101)$ may be a FWHM (101) value in a state before the deformation of the crystal structure of the lithium-transition metal oxide particle is generated.

For example, the in-situ XRD may be a device capable of observing a change of the crystal structure in real time during charging and discharging of the lithium secondary battery.

For example, the lithium secondary battery (e.g., a coin cell) may be attached and assembled by to one side of the in-situ XRD. After performing a formation charging (CC-CV 0.1 C 4.2 C 0.05 C CUT-OFF) and discharging (CC 0.1 C 2.5V CUT-OFF) for the assembled lithium secondary battery, an XRD analysis may be performed in real time by charging and discharging again. The charging and discharging is performed under the same conditions as those of the formation chemical charging and discharging, and the analysis may be performed once per about 7 to 8 minutes.

According to one embodiment, X'Pert PRO (PANalytical Co.) may be used as the in-situ XRD.

For example, the change of the FWHM value of the (101) plane peak of the lithium-transition metal oxide particle during the charging and discharging of the lithium secondary battery may be measured in real time through the in-situ XRD. Accordingly, a degree of distortion of the lattice structure and/or the crystal structure of the lithium-transition metal oxide particle during the charging and discharging process may be evaluated in real time.

Within the range of the FWHM ratio, the distortion of the lattice structure and/or the crystal structure of the lithium-transition metal oxide particle may be suppressed. Additionally, particle cracks and side reactions within the electrode may be suppressed. Accordingly, an amount of gas generation of the lithium secondary battery may be reduced and the life-span properties may be improved.

In an embodiment, the FWHM ratio may be in a range from 200% to 300%. Within the range of the FWHM ratio, a crystallite size and a crystallinity of the lithium-transition metal oxide particle may be properly controlled while preventing the deformation of the crystal structure and/or the lattice structure. Accordingly, the life-span properties of the lithium secondary battery may be improved.

In some embodiments, the $FWHM_{max}(101)$ value may be 0.250 or less, preferably from 0.100 to 0.250. In this case, the lattice structure and/or the crystal structure of the lithium-transition metal oxide particle may be prevented from being excessively deformed during the charging and discharging. Accordingly, the life-span properties and operational stability of the lithium secondary battery may be improved.

In some embodiments, the $FWHM_{min}(101)$ value may be 0.005 or more, and may be preferably from 0.075 to 0.100. In this case, the deformation of the crystal structure and/or the lattice structure can be prevented while appropriately adjusting the crystallite size and the crystallinity of the lithium-transition metal oxide particle. Accordingly, the life-span properties of the lithium secondary battery may be improved.

In some embodiments, the above-described lithium-transition metal oxide particle may include at least two types of doping elements. In this case, the doping elements may be uniformly distributed at a Li site or a transition metal site of the lithium-transition metal oxide particle, so that the structural stability of the lithium-transition metal oxide particle may be improved during insertion/desorption of lithium ions. Accordingly, the distortion and the phase transition of the lattice structure and/or the crystal structure of the lithium-transition metal oxide particle may be suppressed, and thus the FWHM ratio may be reduced.

In some embodiments, the lithium-transition metal oxide particle may be represented by Chemical Formula 1 below.

$$Li_xNi_aCo_bMn_cM1_dM2_eO_{2+y} \qquad \text{[Chemical Formula 1]}$$

In Chemical Formula 1, M1 and M2 may each include at least one of Ti, Zr, Al, Mg and W, $0.8 < x < 1.5$, $0.70 \leq a \leq 0.98$, $0 \leq b \leq 0.20$, $0.02 \leq c \leq 0.30$, $0 < d+e \leq 0.05$, $0.98 \leq a+b+c \leq 1.02$, and $-0.1 \leq y \leq 0.1$.

For example, M1 and M2 may each serve as the doping element.

The lithium-transition metal oxide particles represented by Chemical Formula 1 may include a small amount of the doping so that the structural stability may be further improved while an excessive capacity reduction of the cathode active material may be prevented. Accordingly, the life-span properties of the lithium secondary battery may be further improved.

In some embodiments, a molar ratio of M2 to M1 (d/e) in Chemical Formula 1 may be in a range from 0.05 to 5.5, preferably from 0.50 to 3.5. In this case, the different doping elements M1 and M2 may be uniformly distributed at the lithium site and the transition metal site of the lithium-transition metal oxide. Accordingly, the distortion of the lattice structure and/or the crystal structure during the charging/discharging process may be further reduced.

In some embodiments, the lithium-transition metal oxide particle may have a FWHM change ratio defined by Equation 2 below of 350% or less, preferably less than 300%.

$$\text{FWHM change ratio } (\%) = 100 * (FWHM_{max}(113)/FWHM_{min}(113)) \qquad \text{[Equation 2]}$$

In Equation 2, $FWHM_{max}(113)$ is a maximum FWHM value of a (113) plane peak of the lithium-transition metal oxide particle measured by the in-situ XRD. For example, $FWHM_{max}(113)$ may be a maximum FWHM value of the (113) plane peak of the lithium-transition metal oxide particle measured by the in-situ XRD while charging and discharging the lithium secondary battery once.

In Equation 2, $FWHM_{min}(113)$ is a minimum FWHM value of a (113) plane peak of the lithium-transition metal oxide particle measured by the in-situ XRD. For example, $FWHM_{min}(113)$ may be a minimum FWHM value of the (113) plane peak of the lithium-transition metal oxide particle measured by the in-situ XRD while charging and discharging the lithium secondary battery once.

For example, the $FWHM_{max}(113)$ may be a FWHM(113) value at a point where the deformation of the crystal structure of the lithium-transition metal oxide particle is the greatest during the charging and discharging.

For example, the $FWHM_{min}(113)$ may be a FWHM (113) value in a state before the deformation of the crystal structure of the lithium-transition metal oxide particle is generated.

For example, the change of the FWHM value of the (113) plane peak of the lithium-transition metal oxide particle during the charging and discharging of the lithium secondary battery may be measured in real time through the in-situ XRD. Accordingly, a degree of distortion of the lattice structure and/or the crystal structure of the lithium-transition metal oxide particle during the charging and discharging process may be evaluated in real time.

Within the range of the FWHM change ratio, the distortion of the lattice structure and/or the crystal structure at the (113) plane of the lithium-transition metal oxide particle may be suppressed. Thus, deformation of both the (101) and (113) planes may be controlled to further suppress the distortions.

In exemplary embodiments, the above-described lithium-transition metal oxide particle may be formed through a reaction between a lithium precursor and a transition metal precursor (e.g., a Ni—Co—Mn precursor).

For example, the transition metal precursor may be prepared through a co-precipitation of metal salts. The metal salts may include a nickel salt, a manganese salt and a cobalt salt.

Examples of the nickel salt include nickel sulfate, nickel nitrate, nickel acetate, and a hydrate thereof. Examples of the manganese salt include manganese sulfate, manganese acetate, and a hydrates thereof. Examples of the cobalt salt include cobalt sulfate, cobalt nitrate, cobalt carbonate, and a hydrate thereof.

An aqueous solution may be prepared by mixing the metal salts with a precipitating agent and/or a chelating agent in a ratio satisfying the content or concentration ratio of each metal described with reference to Chemical Formula 1. The transition metal precursor may be prepared by coprecipitating the aqueous solution in a reactor.

The precipitating agent may include an alkaline compound such as sodium hydroxide or sodium carbonate. The chelating agent may include, e.g., ammonia water, ammonium carbonate, etc.

A temperature of the co-precipitation reaction may be controlled, e.g., in a range from about 40° C. to 60° C. A reaction time may be adjusted in a range from about 24 hours to 72 hours.

For example, the transition metal precursor may be reacted with a lithium precursor and a doping element source including a doping element to form the lithium-transition metal oxide particle. The lithium precursor compound may include, e.g., lithium carbonate, lithium nitrate, lithium acetate, lithium oxide, lithium hydroxide, etc. These may be used alone or in a combination thereof.

For example, the doping element source may include titanium dioxide, titanium butoxide, manganese sulfate hydrate, aluminum hydroxide, magnesium hydroxide, zirconium hydroxide, zirconium dioxide, yttria-stabilized zirconia, tungsten oxide, etc. These may be used alone or in a combination thereof.

Thereafter, the doping element may be fixed, or a particle crystallinity may be increased through a heat treatment (calcination) process. In an embodiment, the heat treatment temperature may be performed at a temperature in a range from about 600° C. to 1,000° C.

Figure 2:
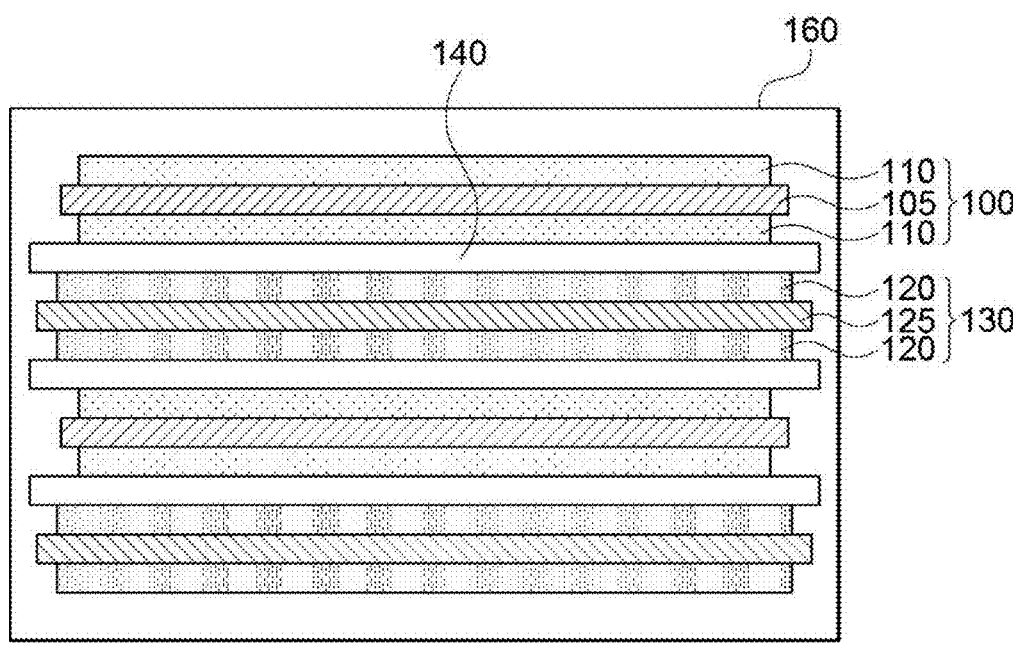

FIGS. 1 and 2 are a schematic plan view and a schematic cross-sectional view, respectively, illustrating a lithium secondary battery in accordance with exemplary embodiments. For example, FIG. 2 is a cross-sectional view taken along a line I-I' of FIG. 1 in a thickness direction.

Referring to FIGS. 1 and 2, the lithium secondary battery may include a cathode 100 including the cathode active material including the above-described lithium-transition metal particle, and an anode 130 facing the cathode 100.

The cathode 100 may include a cathode active material layer 110 formed by coating the cathode active material including the above-described lithium-transition metal oxide particle on a cathode current collector 105.

The cathode active material may include a plurality of the lithium-transition metal oxide particles. For example, an amount of particles of the lithium-transition metal oxide particles may be 50 wt % based on a total weight of the cathode active material. Preferably, the amount of the lithium-transition metal oxide particles may be 60 wt % or more, 70 wt % or more, 80 wt % or more, or 90 wt % or more based on the total weight of the cathode active material.

In an embodiment, the cathode active material may substantially consist of the lithium-transition metal oxide particles.

For example, the cathode active material may be mixed and stirred in solvent with a binder, a conductive material, and/or a dispersive agent to form the slurry. The slurry may be coated on at least one surface of the cathode current collector 105, and then dried and pressed to form the cathode 100.

The cathode current collector 105 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed by coating an anode active material on at least one surface of the anode current collector 125.

The anode active material may include a material capable of adsorbing and ejecting lithium ions. For example, a carbon-based material such as a crystalline carbon, an amorphous carbon, a carbon complex or a carbon fiber, a lithium alloy, silicon or tin may be used as the anode active material.

The amorphous carbon may include a hard carbon, cokes, a mesocarbon microbead (MCMB) fired at a temperature of 1500° C. or less, a mesophase pitch-based carbon fiber (MPCF), etc. The crystalline carbon may include a graphite-based material such as natural graphite, graphitized cokes, graphitized MCMB, graphitized MPCF, etc. The lithium alloy may further include aluminum, zinc, bismuth, cadmium, antimony, silicon, lead, tin, gallium, indium, etc.

The anode current collector 125 may include, e.g., gold, stainless steel, nickel, aluminum, titanium, copper, or an alloy thereof, and preferably may include copper or a copper alloy.

In some embodiments, a slurry may be prepared by mixing and stirring the anode active material with a binder, a conductive material and/or a dispersive agent in a solvent. The slurry may be coated on the anode current collector, and then dried and pressed to form the anode 130.

The binder and the conductive material substantially the same as or similar to those used for the cathode active material layer 110 may be used in the anode 130. In some embodiments, the binder for forming the anode 130 may include an aqueous binder such as styrene-butadiene rubber (SBR) for a compatibility with, e.g., the carbon-based active material, and carboxymethyl cellulose (CMC) may also be used as a thickener.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In exemplary embodiments, an electrode cell may be defined by the cathode 100, the anode 130 and the separation layer 140, and a plurality of the electrode cells may be stacked to form an electrode assembly 150 that may have e.g., a jelly roll shape. For example, the electrode assembly 150 may be formed by winding, laminating or folding of the separation layer 140.

The electrode assembly 150 may be accommodated together with an electrolyte in an outer case 160 to define the lithium secondary battery. In exemplary embodiments, a non-aqueous electrolyte may be used as the electrolyte.

The non-aqueous electrolyte may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3$ $(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

As illustrated in FIG. 1, electrode tabs (a cathode tab and an anode tab) may protrude from the cathode current collector 105 and the anode current collector 125 included in each electrode cell to one side of the case 160. The electrode tabs may be welded together with the one side of the outer case 160 to be connected to an electrode lead (a cathode lead 107 and an anode lead 127) that may be extended or exposed to an outside of the outer case 160.

The lithium secondary battery may be manufactured in, e.g., a cylindrical shape using a can, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope of the present invention. Such alterations and modifications are duly included in the appended claims.

Example 1

Preparation of Preliminary Lithium-Transition Metal Oxide Particle $NiSO_4$, $CoSO_4$ and $MnSO_4$ were mixed in a molar ratio of 0.885:0.090:0.025, respectively, using distilled water from which internal dissolved oxygen was removed by bubbling with $N_2$ for 24 hours. The solution was introduced into a reactor at 50° C., and a co-precipitation reaction was performed for 48 hours using NaOH and $NH_3H_2O$ as a precipitating agent and a chelating agent, respectively, to obtain $Ni_{0.885}Co_{0.09}Mn_{0.025}$ $(OH)_2$ as a transition metal precursor. The obtained precursor was dried at 80° C. for 12 hours and then re-dried at 110° C. for 12 hours.

Lithium hydroxide and the transition metal precursor were added to a dry high-speed mixer at a ratio of 1.01:1, titanium dioxide and zirconium hydroxide were added and uniformly mixed for 5 minutes so that a molar ratio of Ni:Co:Mn:Ti:Zr became 0.885:0.090:0.025:0.015:0.01.

The mixture was put into a firing furnace and heated to 730° C. to 750° C. at a rate of 2° C./min, and maintained at 730° C. to 750° C. for 10 hours. Oxygen was continuously passed at a flow rate of 20 L/min during the ramping and maintenance. After completion of the firing, natural cooling was performed to room temperature, and lithium-transition metal composite oxide particles having a composition of $LiNi_{0.885}Co_{0.09}Mn_{0.025}Ti_{0.015}Zr_{0.01}O_2$ Fabrication of Lithium Secondary Battery A lithium secondary battery was fabricated using the prepared lithium-transition metal composite oxide particles as a cathode active material.

Specifically, a cathode mixture was prepared by mixing the cathode active material, Denka Black as a conductive material and PVDF as a binder in a mass ratio of 97:2:1, respectively, and then coated on an aluminum current collector, followed by drying and pressing to obtain the cathode.

93 wt % of natural graphite as an anode active material, 5 wt % of KS6 as a flake type conductive material, 1 wt % of styrene-butadiene rubber (SBR) as a binder and 1 wt % of carboxymethyl cellulose (CMC) as a thickener were mixed to form an anode slurry. The anode slurry was coated on a copper substrate, and then dried and pressed to form an anode.

The cathode and the anode prepared as described above were each notched by a predetermined size, and stacked with a separator (polyethylene, thickness: 25 μm) interposed therebetween to form an electrode cell. Each tab portion of the cathode and the anode was welded. The welded cathode/separator/anode assembly was inserted in a pouch, and three sides of the pouch except for an electrolyte injection side were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by forming 1M $LiPF_6$ solution in a mixed solvent of ethylene carbonate (EC)/ethyl methyl carbonate (EMC)/diethylene carbonate (DEC) (25/45/30; volume ratio), and then adding 1 wt % of vinylene carbonate, 0.5 wt % of 1,3-propensultone (PRS) and 0.5 wt % of lithium bis(oxalato)borate (LiBOB).

The secondary battery prepared as described above was pre-charged for 36 minutes at a current (5 A) corresponding to 0.25 C. Degasing was performed after 1 hour, aged for more than 24 hours, and them formation charging and discharging were performed (charging condition: CC-CV 0.2 C 4.2V 0.05 C CUT-OFF, discharging condition: CC 0.2 C 2.5V CUT-OFF).

Example 2

A lithium-transition metal oxide and a lithium secondary battery were prepared by the same method as that in Example 1 except that zirconium hydroxide and yttria-stabilized zirconia (YSZ) were added so that a molar ratio of Ni:Co:Mn:Zr:Y became 0.885:0.090:0.025:0.014:0.005.

Lithium-transition metal composite oxide particles having a composition of $LiNi_{0.885}Co_{0.09}Mn_{0.025}Zr_{0.014}Y_{0.005}O_2$ were obtained.

Example 3

A lithium-transition metal oxide and a lithium secondary battery were prepared by the same method as that in Example 1, except that aluminum hydroxide and magnesium hydroxide were added so that a molar ratio of Ni:Co:Mn:Al:Mg became 0.885:0.090:0.025:0.02:0.015.

Lithium-transition metal oxide particles having a composition of $LiNi_{0.885}Co_{0.09}Mn_{0.025}Al_{0.02}Mg_{0.015}O_2$ were obtained.

Example 4

A lithium-transition metal oxide and a lithium secondary battery were prepared by the same method as that in Example 1, except that titanium dioxide was added so that a molar ratio of Ni:Co:Mn:Ti became 0.885:0.090:0.025:0.015.

Lithium-transition metal oxide particles having a composition of $LiNi_{0.885}Co_{0.09}Mn_{0.025}Ti_{0.015}O_2$ were obtained.

Example 5

A lithium-transition metal oxide and a lithium secondary battery were prepared by the same method as that in Example 1, except that titanium dioxide and zirconium hydroxide were added so that a molar ratio of Ni:Co:Mn:Ti:Zr became 0.885:0.090:0.025:0.002:0.045.

Lithium-transition metal oxide particles having a composition of $LiNi_{0.885}Co_{0.09}Mn_{0.025}Ti_{0.002}Zr_{0.045}O_2$ were obtained.

Example 6

A lithium-transition metal oxide and a lithium secondary battery were prepared by the same method as that in Example 1, except that titanium dioxide and zirconium hydroxide were added so that a molar ratio of Ni:Co:Mn:Ti:Zr became 0.885:0.090:0.025:0.03:0.005.

Lithium-transition metal oxide particles having a composition of $LiNi_{0.885}Co_{0.09}Mn_{0.025}Ti_{0.03}Zr_{0.005}O_2$ were obtained.

Example 7

A lithium-transition metal oxide and a lithium secondary battery were prepared by the same method as that in Example 1, except that tungsten oxide and zirconium dioxide were added so that a molar ratio of Ni:Co:Mn:W:Y became 0.885:0.090:0.025:0.01:0.01.

Lithium-transition metal oxide particles having a composition of $LiNi_{0.885}Co_{0.09}Mn_{0.025}W_{0.01}Zr_{0.01}O_2$ were obtained.

Comparative Example 1

A lithium-transition metal oxide and a lithium secondary battery were prepared by the same method as that in Example 1, except that doping elements were not added.

Lithium-transition metal composite oxide particles having a composition of $LiNi_{0.885}Co_{0.09}Mn_{0.025}O_2$ were obtained.

Comparative Example 2

A lithium-transition metal composite oxide and a lithium secondary battery were prepared by the same method as that in Example 1, except that $NiSO_4$, $CoSO_4$ and $MnSO_4$ were mixed in a ratio of 0.8:0.1:0.1, respectively, and no doping element was added.

Lithium-transition metal oxide particles having a composition of $LiNi_{0.8}Co_{0.1}Mn_{0.1}O_2$ were obtained.

Experimental Example (1) Calculation of Molar Ratio (d/e) of Doping Elements In the chemical formulae of the lithium-transition metal oxide particles of Examples and Comparative Examples, the doping element indicated after Mn is defined as M1 in Chemical Formula 1, the doping element indicated after M1 is defined as M2 in Chemical Formula 1, and a molar ratio of the doping elements (d/e) was calculated.

(2) Measurement of FWHM Value of (101) Plane Peak

Each of the lithium secondary batteries of Examples and Comparative Examples was manufactured as a coin cell for an in-situ measurement. After performing the formation process by performing charging (CC-CV 0.1 C 4.2V 0.05 C CUT-OFF) and discharging (CC 0.01 C 2.5V CUT-OFF) once for the coin cell, an in-situ XRD analysis was performed using X'Pert PRO and Empyren equipment manufactured by PANalytical.

The coin cell was put into the in-situ XRD, and charging (CC-CV 0.1 C 4.2V 0.05 C CUT-OFF) and discharging (CC 0.1 C 2.5V CUT-OFF) were performed once, and FWHM values of an (101) plane peak of the lithium-transition metal oxide particles was measured once every 7 minutes during the charging and discharging.

A measured maximum FWHM value was defined as $FWHM_{max}(101)$ and a minimum FWHM value was defined as $FWHM_{min}(101)$, and a FWHM ratio was calculated according to Equation 1.

(3) Measurement of FWHM Value of the (113) Plane Peak

The lithium secondary batteries of Examples and Comparative Examples were put into the in-situ XRD equipment as the above-described (2), and charged (CC-CV 0.2 C 4.2V 0.05 C CUT-OFF) and discharged (CC 0.2 C 2.5V CUT-OFF) was performed once each, and changes of FWHM values of an (113) plane peak of the lithium-transition metal oxide particles were measured once every 7 minutes during the charging and discharging.

A measured maximum FWHM value was defined as $FWHM_{max}(113)$ and a minimum FWHM value was defined as $FWHM_{min}(113)$, and a FWHM change ratio was calculated according to Equation 2.

(4) Measurement of Gas Generation

1) The lithium secondary batteries of Examples and Comparative Examples were left in a chamber at 60° C. for 4 weeks. Thereafter, the batteries were left at room temperature for 30 minutes and placed in a chamber for measuring an amount of gas generation. A vacuum state was formed in the chamber, and then a nitrogen gas was filled to form a normal pressure. A nitrogen volume ($V_0$) and a chamber internal pressure ($P_0$) were measured. After forming a vacuum stated in the chamber again, a hole was made in the battery, and a pressure inside the chamber ($P_1$) was measured. The amount of gas generation was calculated according to an equation as follows.

$$\text{Gas generation amount (mL)} = (V_0/P_0) * P_1$$

2) After storing the lithium secondary batteries of Examples and Comparative Examples in a chamber at 60° C. for 8 weeks, the gas generation amount was measured by the same method as described above.

(5) Measurement of Capacity Retention During Repeated Charging and Discharging

Charging (CC-CV 0.5 C 4.3V 0.05 C CUT-OFF) and discharging (CC 1.0 C 3.0V CUT-OFF) were repeated by

|

500 cycles for the lithium secondary battery according to Examples and Comparative Examples in a 60° C. chamber. A capacity retention was evaluated as a percentage of a discharge capacity at the 500th cycles relative to a discharge capacity at the 1st cycle.

The results are shown in Tables 1 and 2 below.

TABLE 1

| | Doping Element | | | FWHM of (101) plane peak | | | FWHM of (113) plane peak | | |
| | M1 | M2 | d/e | FWHM$_{max}$ | FWHM$_{min}$ | FWHM ratio (%) | FWHM$_{max}$ | FWHM$_{min}$ | FWHM change ratio(%) |
|---|---|---|---|---|---|---|---|---|---|
| Example 1 | Ti | Zr | 1.5 | 0.217 | 0.090 | 241 | 0.4123 | 0.1574 | 262 |
| Example 2 | Zr | Y | 2.8 | 0.244 | 0.093 | 262 | 0.4402 | 0.1673 | 263 |
| Example 3 | Al | Mg | 1.3 | 0.261 | 0.107 | 244 | 0.4515 | 0.1625 | 278 |
| Example 4 | Ti | — | — | 0.278 | 0.088 | 316 | 0.5174 | 0.1552 | 333 |
| Example 5 | Ti | Zr | 0.04 | 0.262 | 0.090 | 291 | 0.4721 | 0.1652 | 286 |
| Example 6 | Ti | Zr | 6 | 0.258 | 0.088 | 293 | 0.4706 | 0.1600 | 294 |
| Example 7 | W | Zr | 1 | 0.225 | 0.082 | 274 | 0.5022 | 0.1406 | 357 |
| Comparative Example 1 | — | — | | 0.300 | 0.061 | 489 | 0.7503 | 0.1845 | 407 |
| Comparative Example 2 | — | — | | 0.298 | 0.072 | 413 | 0.5755 | 0.1653 | 348 |

TABLE 2

| | gas generation (mL) | | capacity retention |
| No. | 4 weeks | 8 weeks | (%, 500 cycles) |
|---|---|---|---|
| Example 1 | 16 | 25 | 94 |
| Example 2 | 18 | 29 | 91 |
| Example 3 | 20 | 32 | 88 |
| Example 4 | 24 | 37 | 84 |
| Example 5 | 21 | 33 | 86 |
| Example 6 | 22 | 33 | 87 |
| Example 7 | 24 | 35 | 86 |
| Comparative Example 1 | 35 | 61 | 68 |
| Comparative Example 2 | 28 | 43 | 73 |

Referring to Tables 1 and 2, in Examples where the FWHM ratio of the lithium-transition metal oxide particles according to Equation 1 was 400% or less, gas generation was explicitly reduced and improved capacity retentions were provided compared to those from Comparative Examples.

Figure 3:
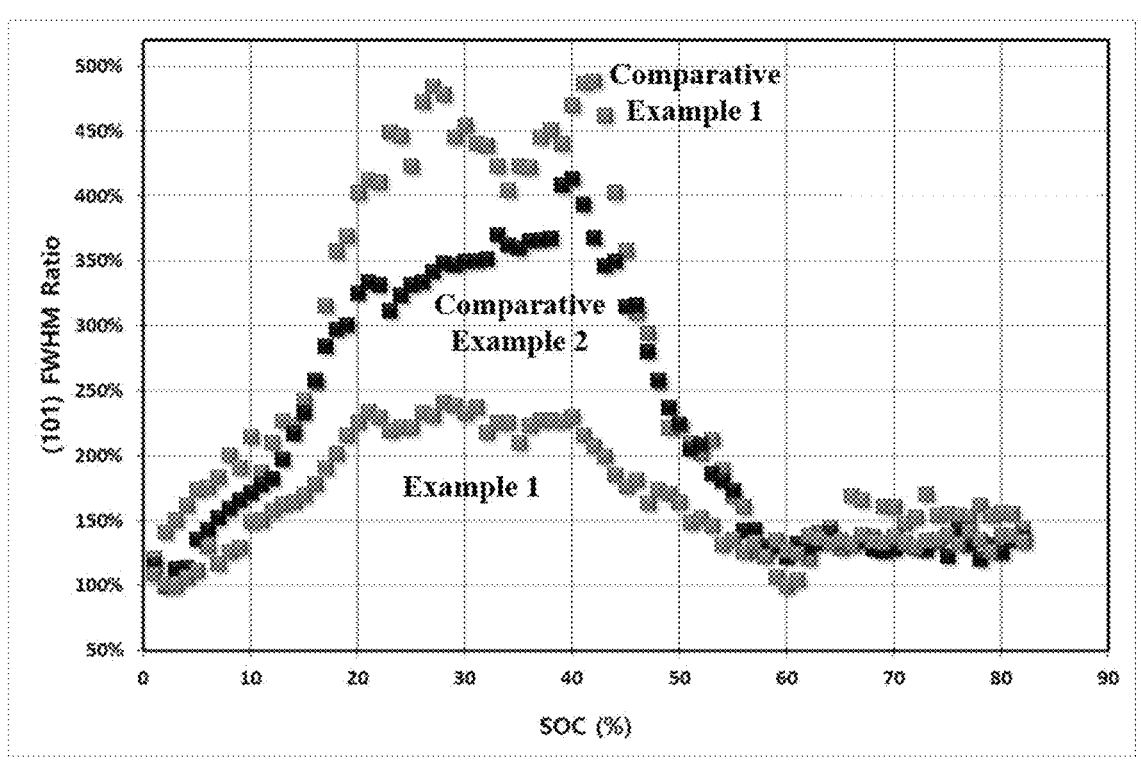
FIG. 3 is a graph showing a change of a FWHM(101) from cathode active materials according to Examples and Comparative Examples during charging and discharging.

FIG. 3 is a graph showing a change of a FWHM (101) from cathode active materials according to Examples and Comparative Examples during charging and discharging. Specifically, FIG. 3 is a graph showing FWHM (101) values according to a state of charge (SOC) during charging and discharging of Example 1, Comparative Example 1 and Comparative Example 2.

Referring to FIG. 3, Example 1 provided a FWHM (101) change much less than those from Comparative Examples 1 and 2.

In Example 3, the FWHM$_{max}$(101) value exceeded 0.250, and the capacity retention was relatively lowered compared to those from Examples 1 and 2.

In Example 4, only a single element was doped into the lithium-transition metal oxide, and the gas generation was increased and the capacity retention was decreased compared to those from other Examples.

In Examples 5 and 6 where the molar ratio of the doping element was not within a range from 0.05 to 0.5, life-span properties were relatively lowered compared to those from other Examples.

In Example 7 where the FWHM change ratio according to Equation 2 exceeded 350%, the gas generation was rela-tively increased and the life-span properties was deteriorated compared to those from other Examples.

What is claimed is:

1. A cathode active material for a lithium secondary battery comprising a lithium-transition metal oxide particle, wherein the lithium-transition metal oxide particle has a full width at half maximum (FWHM) ratio measured by an in-situ X-ray Diffraction spectroscopy (XRD) and defined by Equation 1 of 400% or less:

$$\text{FWHM ratio (\%)} = 100 * (\text{FWHM}_{max}(101)/\text{FWHM}_{min}(101)) \qquad \text{[Equation 1]}$$

wherein, in Equation 1, FWHM$_{max}$(101) is a maximum FWHM value of a (101) plane peak of the lithium-transition metal oxide particle measured by the in-situ XRD, and FWHM$_{min}$(101) is a minimum FWHM value of a (101) plane peak of the lithium-transition metal oxide particle measured by the in-situ XRD, wherein the lithium-transition metal oxide particle includes nickel, cobalt, manganese, and at least two types of doping elements.

2. The cathode active material for a lithium secondary battery according to claim 1, wherein the FWHM ratio is in a range from 100% to 250%.

3. The cathode active material for a lithium secondary battery according to claim 1, wherein the FWHM$_{max}$(101) is 0.250 or less.

4. The cathode active material for a lithium secondary battery according to claim 1, wherein the FWHM$_{min}$(101) is 0.075 or more.

5. The cathode active material for a lithium secondary battery according to claim 1, wherein a change of the FWHM value of the (101) plane peak of the lithium-transition metal oxide particle during charging and discharging of the lithium secondary battery is measured in real time through the in-situ XRD.

6. The cathode active material for a lithium secondary battery according to claim 1, wherein the lithium-transition metal oxide particle is represented by Chemical Formula 1 below:

$$Li_xNi_aCo_bMn_cM1_dM2_eO_{2+y} \qquad \text{[Chemical Formula 1]}$$

wherein, in Chemical Formula 1, M1 and M2 each includes at least one of Ti, Zr, Al, Mg and W, and $0.8<x<1.5$, $0.70 \leq a \leq 0.98$, $0 \leq b \leq 0.20$, $0.02 \leq c \leq 0.30$, $0<d+e \leq 0.05$, $0.98 \leq a+b+c \leq 1.02$, and $-0.1 \leq y \leq 0.1$.

7. The cathode active material for a lithium secondary battery according to claim 6, wherein, in Chemical Formula 1, $0.05 \leq d/e \leq 5.5$.

8. The cathode active material for a lithium secondary battery according to claim 7, wherein, in Chemical Formula 1, $0.50 \leq d/e \leq 3.5$.

9. The cathode active material for a lithium secondary battery according to claim 1, wherein the lithium-transition metal oxide particle has a FWHM change ratio defined by Equation 2 below of 350% or less:

$$\text{FWHM change ratio (\%)}=100*(FWHM_{max}(113)/FWHM_{min}(113)) \qquad \text{[Equation 2]}$$

wherein, in Equation 2, $FWHM_{max}(113)$ is a maximum FWHM value of a (113) plane peak of the lithium-transition metal oxide particle measured by the in-situ XRD, and $FWHM_{min}(113)$ is a minimum FWHM value of a (113) plane peak of the lithium-transition metal oxide particle measured by the in-situ XRD.

10. The cathode active material for a lithium secondary battery according to claim 9, wherein the FWHM change ratio is less than 300%.

11. A lithium secondary battery, comprising:

a cathode comprising a cathode active material layer that comprises the cathode active material for a lithium secondary battery of claim 1; and an anode facing the cathode.

* * * * *